US 7,966,401 B2

(12) United States Patent
Belgaied et al.

(10) Patent No.: US 7,966,401 B2
(45) Date of Patent: *Jun. 21, 2011

(54) METHOD AND APPARATUS FOR CONTAINING A DENIAL OF SERVICE ATTACK USING HARDWARE RESOURCES ON A NETWORK INTERFACE CARD

(75) Inventors: Kais Belgaied, Sunnyvale, CA (US); Sunay Tripathi, San Jose, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 1144 days.

This patent is subject to a terminal disclaimer.

(21) Appl. No.: 11/480,100

(22) Filed: Jun. 30, 2006

(65) Prior Publication Data

US 2008/0005360 A1    Jan. 3, 2008

(51) Int. Cl.
*G06F 15/173* (2006.01)
*G06F 11/00* (2006.01)

(52) U.S. Cl. ............... 709/225; 726/22; 726/23; 726/25; 370/229; 370/230; 370/235; 709/223; 709/250

(58) Field of Classification Search .................. 709/224, 709/245, 223–5; 370/229, 392, 412, 420; 726/13, 25, 22
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,801,940 B1 * | 10/2004 | Moran et al. | 709/224 |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 * | 8/2007 | Mehrvar et al. | 370/412 |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner* — Joseph Thomas
*Assistant Examiner* — Tae K Kim
(74) *Attorney, Agent, or Firm* — Osha • Liang LLP

(57) ABSTRACT

A method for processing packets, where the method includes programming a hardware classifier in a network interface card (NIC) to send packets associated with a first packet destination to a non-standby hardware receive ring (HRR), programming a software ring to obtain packets from the non-standby HRR, programming the software ring to send packets for the first destination to a first software receive ring (SRR), wherein the first packet destination is associated with the first SRR, obtaining identifying information about a packet associated with a denial of service (DoS) attack, programming the hardware classifier, using the identifying information, to send the packet associated with the DoS attack to a standby HRR, and for each packet received by the hardware classifier determining to which of the standby HRR and the non-standby HRR to send the packet using the programming of the hardware classifier.

14 Claims, 9 Drawing Sheets

U.S. PATENT DOCUMENTS

| | | | |
|---|---|---|---|
| 7,313,142 B2 | 12/2007 | Matsuo et al. | |
| 7,499,457 B1 * | 3/2009 | Droux et al. | 370/395.7 |
| 7,499,463 B1 * | 3/2009 | Droux et al. | 370/412 |
| 7,593,404 B1 * | 9/2009 | Droux et al. | 370/392 |
| 7,607,168 B1 * | 10/2009 | Tripathi et al. | 726/13 |
| 7,623,538 B1 * | 11/2009 | Tripathi et al. | 370/420 |
| 7,627,899 B1 * | 12/2009 | Tripathi et al. | 726/25 |
| 7,640,591 B1 * | 12/2009 | Tripathi et al. | 726/25 |
| 7,675,920 B1 * | 3/2010 | Droux et al. | 370/395.5 |
| 7,697,434 B1 * | 4/2010 | Tripathi et al. | 370/235 |
| 7,739,736 B1 * | 6/2010 | Tripathi et al. | 726/22 |
| 7,746,783 B1 * | 6/2010 | Tripathi et al. | 370/235 |
| 2002/0052972 A1 * | 5/2002 | Yim | 709/245 |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0190694 A1 * | 9/2005 | Ben-Nun et al. | 370/229 |
| 2006/0041667 A1 * | 2/2006 | Ahn et al. | 709/229 |
| 2006/0045089 A1 | 3/2006 | Bacher et al. | |
| 2006/0070066 A1 | 3/2006 | Grobman | |
| 2006/0174324 A1 * | 8/2006 | Zur et al. | 726/3 |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

METHOD AND APPARATUS FOR CONTAINING A DENIAL OF SERVICE ATTACK USING HARDWARE RESOURCES ON A NETWORK INTERFACE CARD

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method And Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. Application Serial No. 11/479,046; "Method and System for Controlling Virtual Machine Bandwidth" with U.S. Application Serial No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Virtual Network Interface Cards with VLAN Functionality" with U.S. Application Serial No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; and "Serialization Queue Framework for Transmitting Packets" with U.S. application Ser. No. 11/479,143.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

With the rising popularity of offering critical services (e.g., web services, applications, identity services, mail services, etc.) on the Internet, attacks on the receiving system that offer such critical services have become relatively common. A common attack is a denial of service (DoS) attack where a sending system bombards a receiving system (i.e., host) with a large number of packets causing excessive amounts of endpoint, and possibly transit, network bandwidth (or resources) to be consumed. Such attacks are commonly referred to as packet flooding attacks. Recently, the use of source IP address spoofing during DoS attacks and the advent of distributed attack methods and tools have provided a continuing challenge in the area of DoS attack mitigation.

The Internet is entirely composed of limited resources. Such limited resources as network bandwidth, processor resources, and storage capacities are all common targets for DoS attacks designed to consume enough of a host's available resources to cause some level of service disruption. One reaction to DoS attacks is to overprovision a system to handle excess loads that may be generated by the attack. However, a limit exists to the amount of limited resources that can be allocated to a system, both in terms of availability and cost. Accordingly, most of the service providers with any level of critical services on the Internet deploy various kinds of resource consumption monitors to assist in identifying when packet destinations (i.e., containers or services) are consuming excessive resources, such as network bandwidth and CPU resources, and undergoing a DoS attack.

Attacks initiated on a single container or service, which is located on a single computer system with multiple containers and services, has the effect of disrupting all containers or services on the computer system. Consider an example where an Internet Service Provider (ISP) (e.g., Earthlink, AOL, Yahoo, etc.) hosts multiple websites on the same physical computer system by establishing several containers, which are virtual application environments. If only one of the websites hosted on the same computer system is under a DoS attack, then the entire computer system grinds to a halt and all other containers on the same computer system suffer. Customers running multiple services on the same machine are faced with the same problem. For example, if a customer runs a http and a https based service on the same computer system and a DoS attack is initiated against just one service, all services on that computer system grind to a halt.

SUMMARY

In general, in one aspect, the invention relates to a method for processing packets. The method includes programming a hardware classifier in a network interface card (NIC) to send packets associated with a first packet destination to a non-standby hardware receive ring (HRR), programming a software ring to obtain packets from the non-standby HRR, programming the software ring to send packets for the first destination to a first software receive ring (SRR), wherein the first packet destination is associated with the first SRR, obtaining identifying information about a packet associated with a denial of service (DoS) attack, programming the hardware classifier, using the identifying information, to send the packet associated with the DoS attack to a standby HRR, and for each packet received by the hardware classifier determining to which of the standby HRR and the non-standby HRR to send the packet using the programming of the hardware classifier, wherein the standby HHR and the non-standby HRR are located on the NIC.

In general, in one aspect, the invention relates to a method for processing packets. The method includes initially programming a hardware classifier in a network interface card (NIC) to send packets associated with a first packet destination to a standby hardware receive ring (HRR) and to send packets associated with a second packet destination to a non-standby HRR, initially programming a software ring to obtain packets from the non-standby HRR, initially programming a software ring to send packets for the second packet destination to a first software receive ring (SRR), wherein the second packet destination is associated with the first SRR, obtaining identifying information about packets associated with a denial of service (DoS) attack, programming the hardware classifier, using the identifying information, to send packets associated with the DoS attack to the standby HRR, programming the hardware classifier, after obtaining the identifying information, to send packets for the first packet destination to the non-standby HRR, and programming the software classifier, after obtaining the identifying information, to send packets for the first packet destination to a second SRR, and upon receiving a packet, determining, by the hardware classifier, to which of the standby HRR and the non-standby HRR to send the packet, wherein the standby HHR and the non-standby HRR are located on the NIC, and wherein the first SRR and second SRR are located in the software ring.

In general, in one aspect, the invention relates to a system. The system includes a network interface card (NIC), comprising: a standby hardware receive ring (HRR), a non-standby HRR, and a hardware classifier, wherein the hardware classifier is programmed to send packets for a first packet destination to the non-standby ring, wherein the hardware classifier is initially configured to: for each packet received by the NIC, determine, to which of the standby HRR and the non-standby HRR to send the packet based on programming of the hardware classifier, a host, operatively connected to the NIC, comprising: a first packet destination configured to receive packets from a first software receive ring (SRR), a software ring, comprising: the first SRR, and a software classifier, initially configured to send packets for the first destination to the first SRR, wherein the software ring is configured to obtain packets from the non-standby HRR, wherein the host is configured to: obtain identifying information about packets associated with a denial of service (DoS) attack on the host, program the hardware classifier, using the identifying information, to send packets associated with the DoS attack to the standby HRR.

Other aspects of the invention will be apparent from the following description and the appended claims.

DETAILED DESCRIPTION

Figure 1:
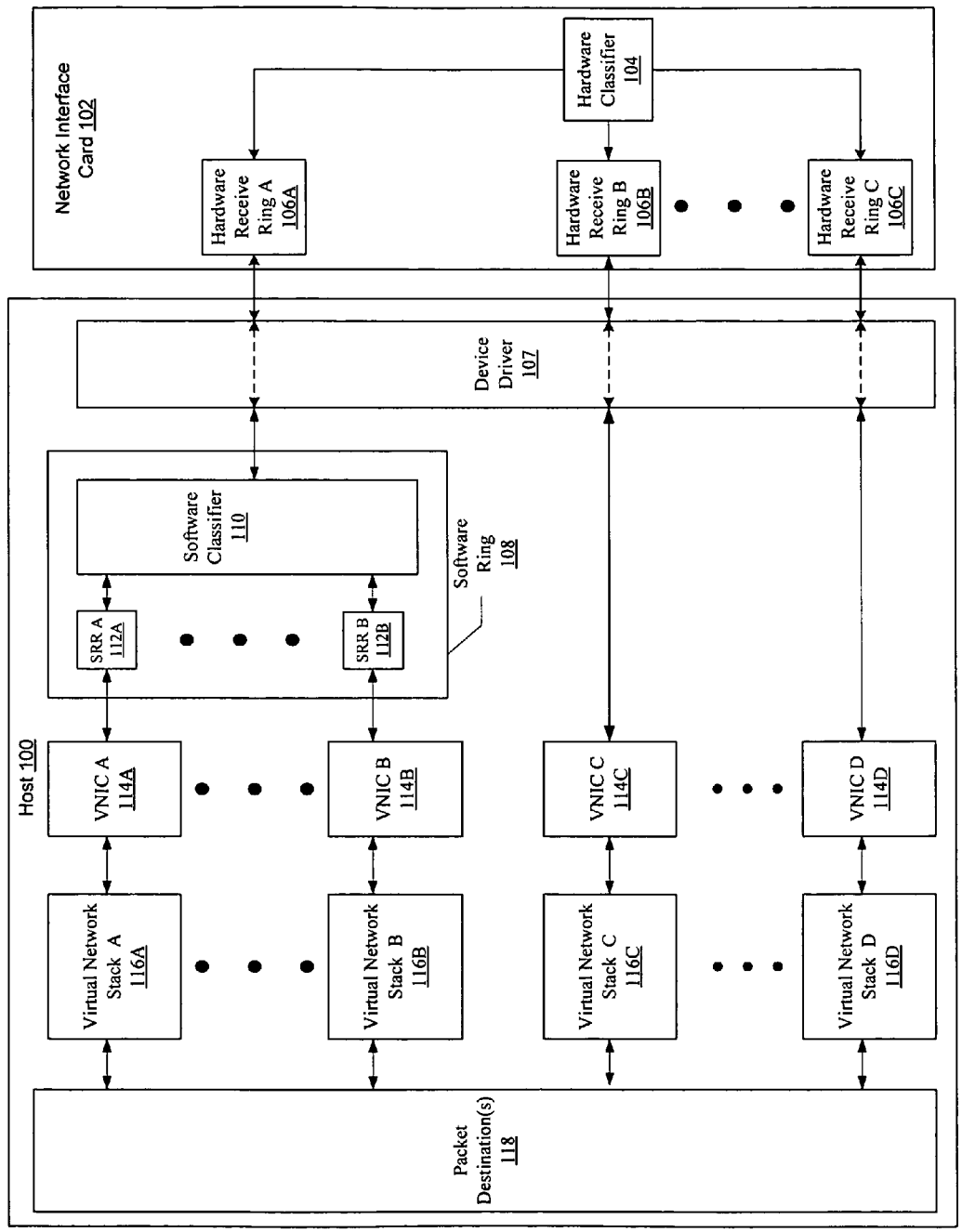
FIG. 1 shows system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for defending against a denial of service attack (DoS). More specifically, embodiments of the invention relate to a method and system for containing a DoS attack using hardware resources on a network interface card (NIC) in combination with software resources on a host operatively connected to the NIC.

FIG. 1 shows a system in accordance with one embodiment of the invention. As shown in FIG. 1, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then sent to other components on the NIC (102) for processing. In one embodiment of the invention, the NIC (102) includes a classifier (104) and one or more hardware receive rings (HRRs) (106A, 106B, 106C). In one embodiment of the invention, the HRRs (106A, 106B, 106C) correspond to portions of memory within the NIC (102) used to temporarily store the received packets. Further, in one embodiment of the invention, a HRRs (106A, 106B, 106C) may point to host memory.

In one embodiment of the invention, the hardware classifier (104) is configured to analyze the incoming network traffic, typically in the form of packets, received from the network (not shown). In one embodiment of the invention, at least one HRR (106A, 106B, 106C) is configured to store packets in accordance with a DoS countermeasure policy (discussed below).

In one embodiment of the invention, analyzing individual packets includes determining to which of the HRRs (106A, 106B, 106C) each packet is sent. In one embodiment of the invention, analyzing the packets by the hardware classifier (104) includes analyzing one or more fields in each of the packets to determine to which of the HRRs (106A, 106B, 106C) the packets are sent. As an alternative, the hardware classifier (104) may use the contents of one or more fields in each packet as an index into a data structure that includes information necessary to determine to which HRR (106A, 106B, 106C) that packet is sent. The hardware classifier (104) may be implemented entirely in hardware (i.e., the hardware classifier (104) may be a separate microprocessor embedded on the NIC (102)). Alternatively, the hardware classifier (104) may be implemented in software stored in memory (e.g., firmware, etc.) on the NIC (102) and executed by a microprocessor on the NIC (102).

In one embodiment of the invention, the host (100) may include the following components: a device driver (107), a software ring (108), one or more virtual NICs (114A, 114B, 114C, 114D), one or more virtual network stacks (116A, 116B, 116C, 116D), and one or more packet destinations (118) (e.g., containers and/or services). Each of the aforementioned components is described below.

In one embodiment of the invention, the device driver (107) provides an interface between the HRRs (106A, 106B, 106C) and the host (100). More specifically, the device driver (107) exposes the HRRs (106A, 106B, 106C to the host (100).

In one embodiment of the invention, the software ring (108) includes a software classifier (110) and a number of software receive rings (SRR) (e.g., SRR A (112A), SRR B (112B)). In one embodiment of the invention, the software classifier (110) has the same functionality as the hardware classifier (104). However, instead of sending the classified packets to a HRR (106A, 106B, 106C), the software classifier (110) forwards classified packets to one of the SRRs (112A, 112B). The SRRs (112A, 112B) like the HRRs (106A, 106B, 106C) are configured to temporarily store the received packets after they have been classified by the software classifier (110).

In one embodiment of the invention, each of the virtual NICs (114A, 114B, 114C, 114D) is associated with either a SRR (112A, 112B) or a HRR (106A, 106B, 106C). The virtual NICs (114A, 114B, 114C, 114D) provide an abstraction layer between the NIC (102) and the various packet destinations (118) (e.g., containers and/or services) executing on the host (100). More specifically, each virtual NIC (114A, 114B, 114C, 114D) operates like a NIC (100). For example, in one embodiment of the invention, each virtual NIC (114A, 114B, 114C, 114D) is associated with one or more Internet Protocol (IP) addresses, one or more Media Access Control (MAC) address, optionally, one or more ports, and, is optionally, configured to handle one or more protocol types. Thus, while the host (100) may be operatively connected to a single NIC (102), packet destinations (118) (e.g., containers and/or services) executing on the host (100)) operate as if the host (100) is bound to multiple NICs.

Each of the virtual NICs (114A, 114B, 114C, 114D) is operatively connected to a corresponding virtual network stack (116A, 116B, 116C, 116D). In one embodiment of the invention, each virtual network stack (116A, 1116B, 116C, 116D) includes functionality to process packets in accordance with various protocols used to send and receive packets (e.g., Transmission Communication Protocol (TCP), Internet Protocol (IP), User Datagram Protocol (UDP), etc.). Further, each virtual network stack (116A, 116B, 116C, 116D) may also include functionality, as needed, to perform additional processing on the incoming and outgoing packets. This additional processing may include, but is not limited to, cryptographic processing, firewall filtering, etc.

In one embodiment of the invention, each virtual network stack (116A, 116B, 116C, 116D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the virtual network stacks (116A, 116B, 116C, 116D) is discussed in FIG. 2.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to containers, services (e.g., web server), etc. As shown in FIG. 1, each of the virtual network stacks (116A, 116B, 116C, 116D) is associated with a packet destination (118). In one or more embodiments of the invention, each packet destination is associated with a single virtual network stack (116A, 116B, 116C, 116D). Alternatively, each packet destination is associated with one or more virtual network stacks (116A, 116B, 116C, 116D).

In one embodiment of the invention, each virtual network stack (116A, 116B, 116C, 116D) is associated with a bandwidth allocation. Those skilled in the art will appreciate that if there is only one virtual network stack (116A, 116B, 116C, 116D) bound to the packet destination (118), then the bandwidth allocation of the virtual network stack (116A, 116B, 116C, 116D) corresponds to the bandwidth allocated to the packet destination (118). In one embodiment of the invention, the bandwidth allocation corresponds to the number of packets the packet destination may receive in a given time interval (e.g., seconds). The bandwidth allocation for a given packet destination is enforced by the virtual network stack operating in polling mode (discussed in FIG. 4).

In one embodiment of the invention, the virtual NIC (114A, 114B, 114C, 114D) may be bound to a virtual machine (e.g., Xen Domain) instead of a virtual network stack (116A, 116B, 116C, 116D). In such cases, the virtual NIC is bound to an interface (e.g., a Xen interface), where the interface enables the virtual NIC to communicate to with the virtual machine. In one embodiment of the invention, the aforementioned virtual machine includes its own virtual network stack and includes its own operating system (OS) instance, which may be different than the OS executing on the host.

Those skilled in the art will appreciate that the HRRs (106A, 106B, 106C) are typically configured to store a limited number of packets. Further, once the HRRs (106A, 106B, 106C) are "full" (i.e., the HRRs (106A, 106B, 106C) cannot store any additional packets), then the packets received after this point are dropped (i.e., they are not stored in the HRRs (106A, 106B, 106C)). Further, those skilled in the art will appreciate that the HRRs (106A, 106B, 106C) become "full"

when the rate at which the packets are received by the HRRs (106A, 106B, 106C) is greater than the rate at which the packets are removed from the HRRs (106A, 106B, 106C) by the corresponding VNSs (116A, 1116B, 116C, 116D).

Figure 2:
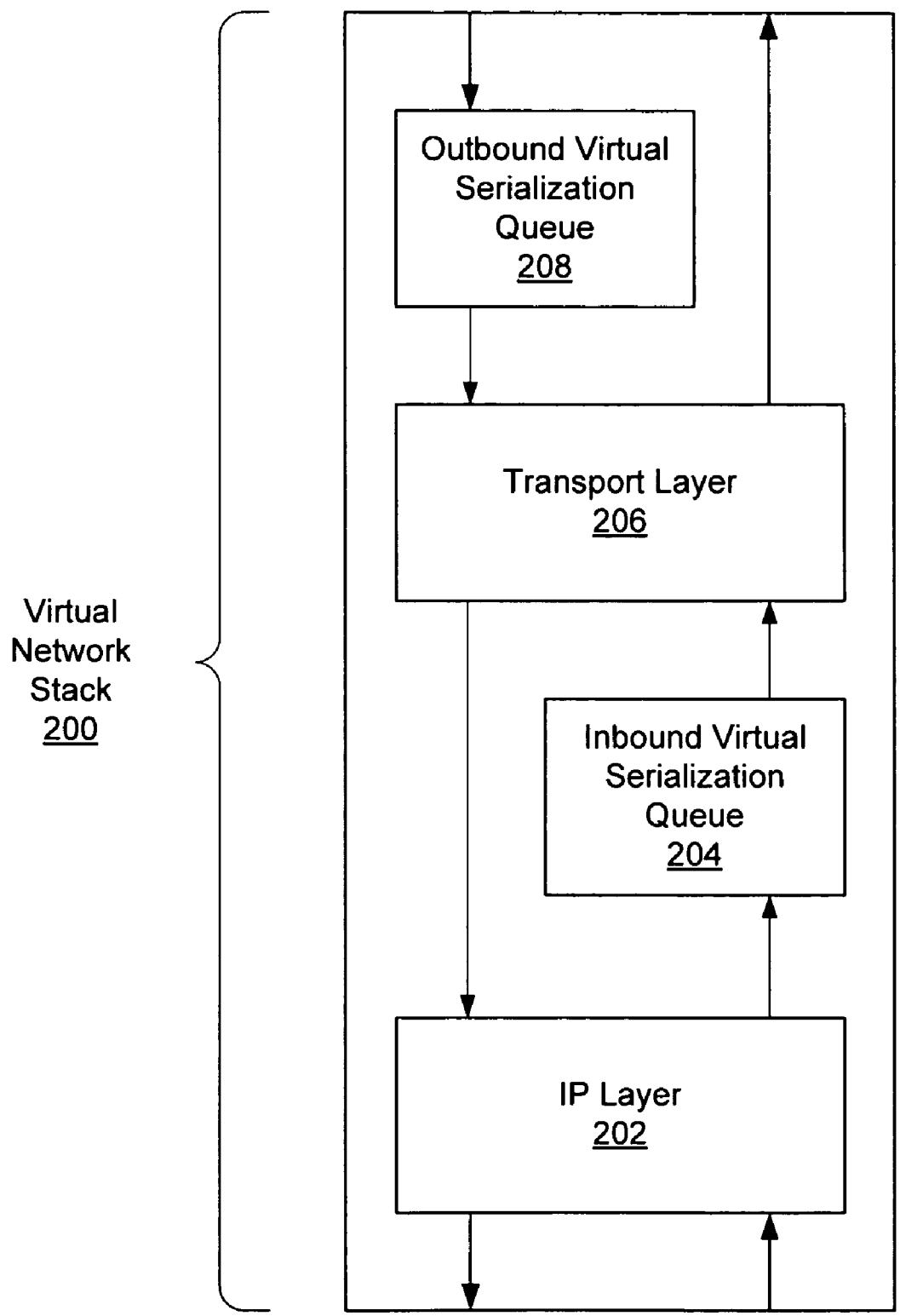
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (204), a transport layer (206), and an outbound serialization queue (208). Each of the aforementioned components is discussed below.

In one embodiment, the IP layer (202) is configured to receive packets from the VNIC associated with the VNS (204) (e.g., VNS 1 (112) receives packets from VNIC (106) in FIG. 1). Further, the IP layer (202) is configured to receive packets from the transport layer (106). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being processed by the transport (206). In one embodiment of the invention, the inbound VSQ (204) may be used to control the number of packets being received by the packet destination associated with VNS. The inbound VSQ (204) may control the bandwidth by limiting the number of packets in the VSQ (204) and preventing additional packets from entering the VNS (200) until the inbound VSQ (204) has fewer than a threshold number of packets.

In one embodiment of the invention, the transport layer (206) is configured to process inbound and outbound packets in accordance with Transmission Control Protocol (TCP), User Datagram Protocol (UDP), or both UDP and TCP.

In one embodiment of the invention, the outbound VSQ (208) is a queue data structure configured to receive packets from the packet destination with which the VNS (204) is associated. Further, the outbound VSQ (208) is configured store packets prior to sending the received packets to the transport layer (206). In one embodiment of the invention, the outbound VSQ (208) is also configured to control the flow of packets from the packet destination associated with the VNS (204) to the VNS (204). In one embodiment of the invention, the outbound VSQ (208) (or a related process) is configured to block an application from sending packets to the outbound VSQ (208), if the packet destination is attempting to issue packets at a higher rate than the outbound bandwidth allocated to the packet destination. Further, the outbound VSQ (208) (or a related process) is configured to notify the packet destination when it is no longer blocked from issuing packets to the VNS (204).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the packet processing requirements imposed by the transport layer (206). For example, TCP requires that serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ at a time. Thus, if two threads are attempting to access a given VSQ, one thread must wait until the other thread has finished accessing the VSQ.

Alternatively, if the transport layer (206) only supports UDP, then the inbound VSQ (204) and outbound VSQ (208) may be configured to allow concurrent access. Said another way, two or more threads may concurrently access the VSQ. In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

Figure 3:
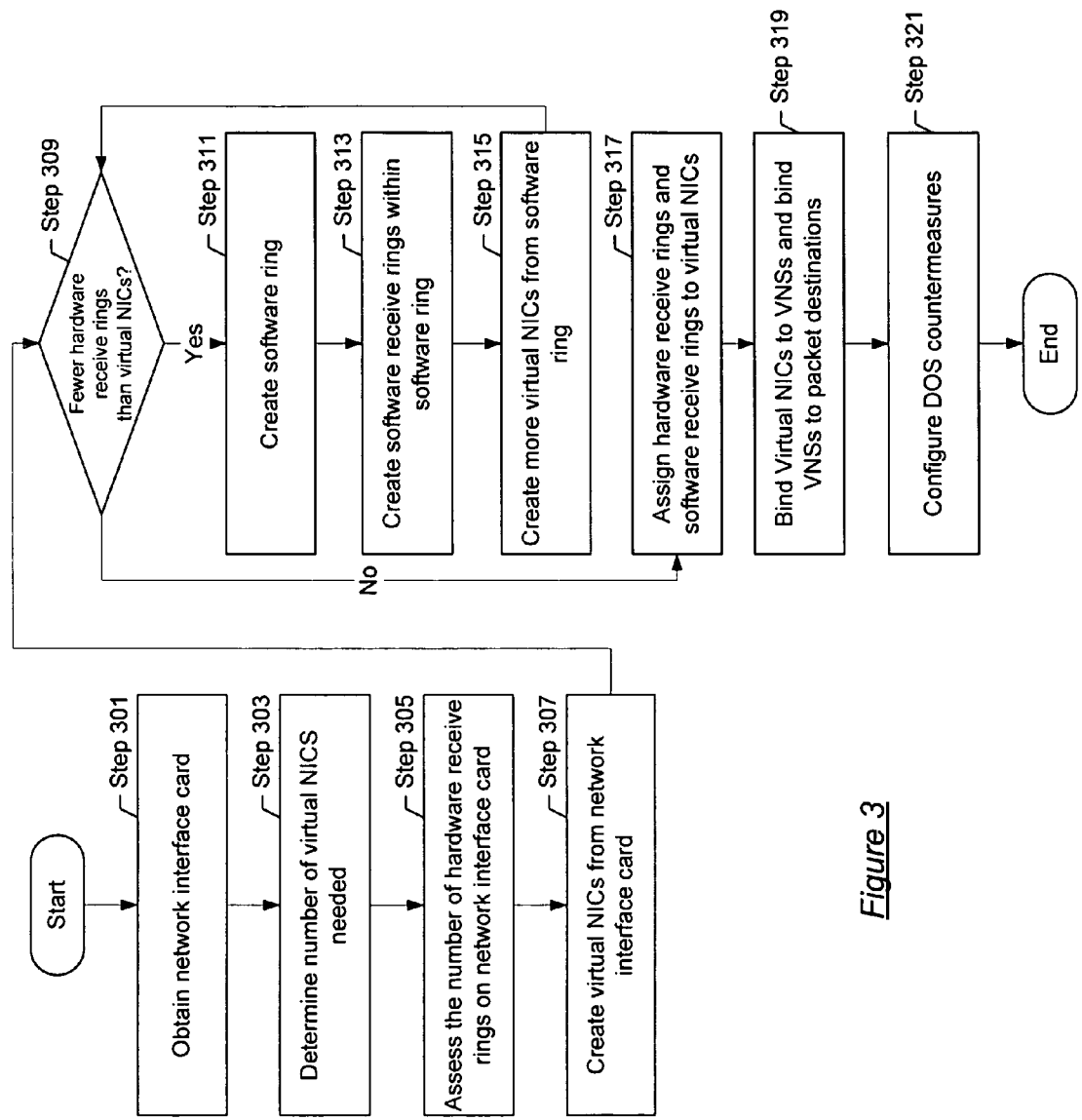
FIGS. 3-6 show flow charts in accordance with one embodiment of the invention.

FIG. 3 shows a flow diagram in accordance with one or more embodiments of the invention. First, a network interface card (NIC) is obtained (Step 301). As stated above, the NIC is connected to a host and is responsible for sending and receiving packets between the host and a physical network. Once the NIC is obtained, a determination is made regarding the number of virtual NICs needed on the host (Step 303). In one or more embodiments of the invention, the number of virtual NICs needed corresponds to the number of packet destinations on the host. Further, in one or more embodiments of the invention, packet destinations on the host correspond to containers or services that send and receive packets. For example, a virtual NIC may be created for each virtual machine on the host, or a virtual NIC may be created for each application running on each virtual machine on the host.

Once the number of virtual NICs to be created has been determined, the hardware receive rings on the NIC are assessed (Step 305). In one or more embodiments of the invention, a single hardware receive ring corresponds to a single virtual NIC and temporarily stores packets to be sent to the virtual NIC. As a result, when more virtual NICs are needed than there are hardware receive rings on the NIC, one or more soft rings is created to appropriately route packets to the extra virtual NICs.

Virtual NICs are first created from the NIC (Step 307). Next, a determination is made about whether fewer hardware receive rings exist on the NIC than there are virtual NICs (Step 309). If not, the hardware receive rings on the NIC are assigned to virtual NICs (Step 317). Otherwise, a software ring is created on top of one of the hardware receive rings on the NIC (Step 311). A set of software receive rings is then created within the software ring (Step 313) and more virtual NICs are created and assigned to the software ring (Step 315). As described in FIG. 1, the software ring is associated with a software classifier, which directs packets to the appropriate software receive rings based on the contents of the fields in the packet headers.

Once the virtual NICs have associated with the software ring, a determination is made about whether more virtual NICs need to be created (Step 309). If so, the process is repeated until all virtual NICs can be assigned a hardware receive ring or software receive ring; then the hardware receive rings and software receive rings are assigned to the virtual NICs (Step 317).

Once the virtual NICs have been assigned to the software receive rings or hardware receive rings, the virtual NICs are bound to virtual network stacks, where the virtual network stacks are bound to packet destinations (Step 319). In one embodiment of the invention, if the packet destination is a virtual machine, then the virtual NIC is bound to an interface rather than a packet destination.

Once Step 319 is completed, the DoS countermeasures are configured (Step 321). In one embodiment of the invention, if all the hardware receive rings are associated with a virtual NIC (or an interface to a virtual machine), then one (or more) of the hardware receive rings is designated as a standby HRR (s). Alternatively, if one (or more) of the hardware receive rings is not associated with a virtual NIC(s), then that hardware receive ring(s) may be designated as a standby HRR (s).

In one embodiment of the invention, when the host is operating normally (i.e., is not under DoS attack) the standby HRR(s) is either (i) receiving packets, where the packets are associated with a packet destination on the host or (ii) is not receiving any packets. However, once the host (or a system monitoring the host) detects a DoS attack, the standby HRR(s) is used to contain the DoS attack. The method for using the standby HRR(s) is described below in FIGS. 5-8.

As stated above, software rings can be arbitrarily created on top of HRR or software SRRs with the software rings. As a result, different structures involving software rings can be created to handle the same number of virtual NICs using the method shown in FIG. 3.

Figure 4:
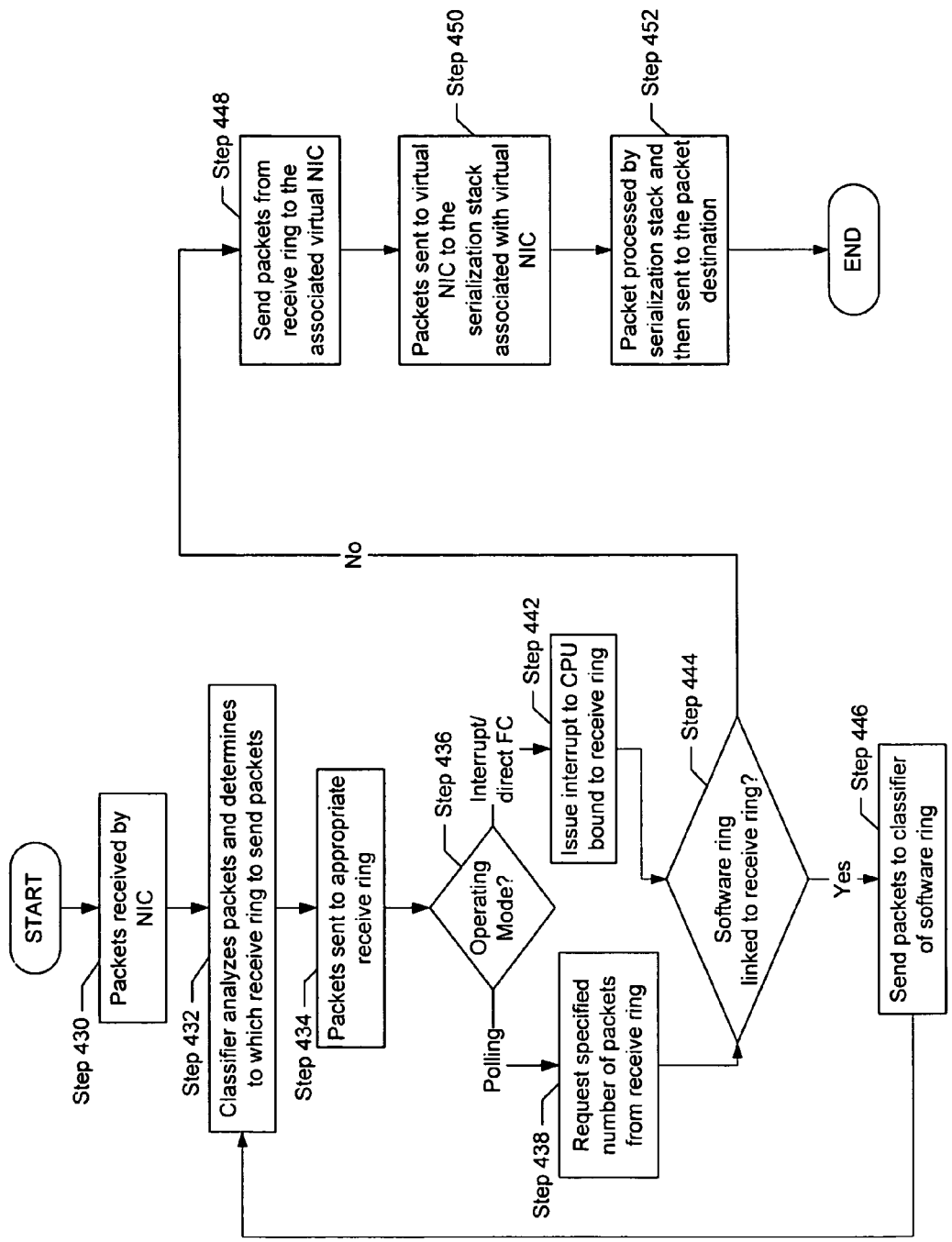

FIG. 4 shows a flow diagram in accordance with one or more embodiments of the invention. Initially, packets are received by a NIC (Step 430). Next, a classifier associated with the NIC determines to which receive ring (HRR or SSR) on the NIC to steer packets (Step 432). The packets are then sent to the appropriate receive ring (Step 434) based on the classifier's assessment. At this stage, the processing of the packets differs depending on mode in which the virtual serialization queue (which is bound to the receive ring or connected to the receive ring via a software ring) is operating. The aforementioned virtual serialization queue is associated with the serialization stack bound to virtual NIC associated with the receive ring. Continuing with the discussion of FIG. 4, the processing of the packets depends on whether the virtual serialization queue is operating in polling mode or interrupt mode (or a direction function call, if the receive ring is a software receive ring is associated with a VNS) (Step 436).

If the virtual serialization queue is operating in polling mode, then the packets remain in the receive ring until the virtual serialization queue requests a specified number of packets from the receive ring (Step 438). In one embodiment of the invention, the virtual serialization queue does not request any packets when there are packets already queued on the virtual serialization queue. In one or more embodiments of the invention, the virtual serialization queue retrieves all packets from the receive ring when a request is made for packets. Those skilled in the art will appreciate that the receive rings store a finite number of packets. Thus, if the receive rings receive packets at a faster rate than the rate at which the corresponding virtual serialization queues requests the packets, the receive rings will eventually fill completely with packets and packets received after this point are dropped until packets on the receive rings are requested and processed. In one embodiment of the invention, the rate at which packets are requested from the receive ring (SRR or HRR) and the number of packets requested is determined by the bandwidth allocation of the virtual network stack bound to the receive ring.

Alternatively, if the virtual serialization queue is operating in interrupt mode (or direct function call mode), then an interrupt is issued to the CPU bound to the receive ring (i.e., the CPU bound to the virtual serialization queue that is bound to the stack associated with the receive ring) (or a function call is issued to the associated VNS) (Step 442). The packets are then sent to the virtual serialization queue or an intermediate software ring based on the inbound flow control state.

Once the packets are requested, a determination is made about whether a software ring is linked to the receive ring (Step 444). If so, the packets are sent to the software classifier corresponding to the software ring (Step 446), which further forwards the packets to the appropriate software receive rings according to the operating mode (Step 432-Step 444). In the event that the receive ring is an HRR and the HRR is bound to a software ring, the classifier in Step 432 now corresponds to a software classifier and all references to receive rings in Steps 432-444 correspond to SRRs. Said another way, when Steps 432-444 are initially performed, the classifier corresponds to a hardware classifier and the receive rings correspond to HRRs. However, if the HRR is bound to a software ring (Step 446), then in all subsequent executions of Steps 432-444, the classifier corresponds to a software classifier and all references to receive rings in Steps 432-444 correspond to SRRs.

Continuing with the discussion of FIG. 4, if the HRR (or SRR) is bound to a virtual NIC, then the packets are sent to the virtual NIC (Step 448). The virtual NIC subsequently forwards the packets to the associated serialization stack (Step 450), where the packets are processed and then sent to the packet destination (e.g., a virtual machine, a container, a service, etc.) (Step 452).

Figure 5:
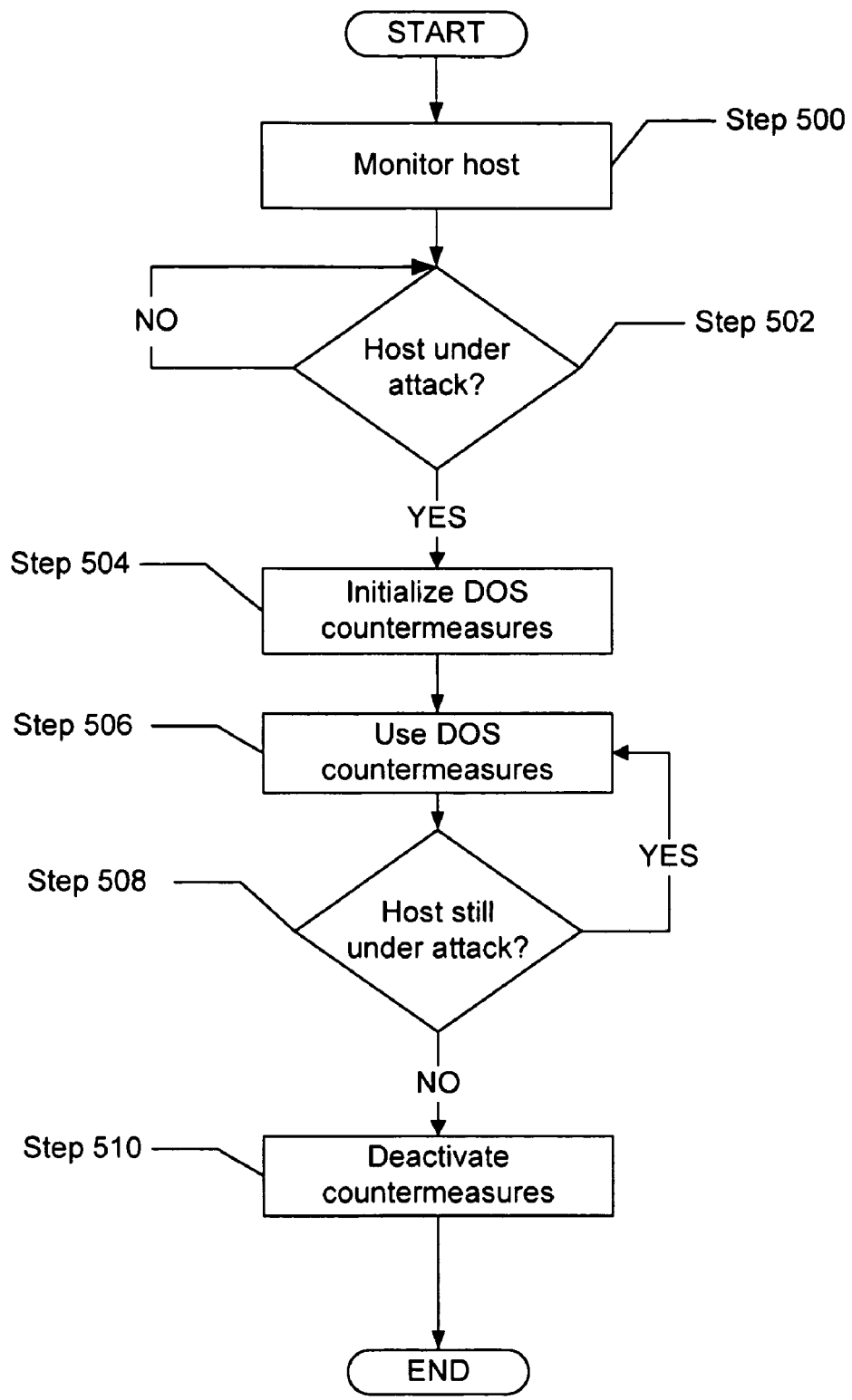

FIG. 5 shows a flowchart in accordance with one embodiment of invention. Initially, the host is monitored (Step 500). In one embodiment of the invention, the host monitoring may include monitoring the volume of network traffic received by the host (as well as other characteristics of the host) to determine whether the host is under a DoS attack. Those skilled in the art will appreciate that the determination of whether the host is under a DoS attack may be determined using techniques well known in the art.

If a DoS attack is occurring (Step 502), the host proceeds to initialize the DoS countermeasures (discussed below in FIG. 6) (Step 504). The DoS countermeasures are subsequently used to defend against the DoS attack (Step 506).

Periodically, a determination is made about whether the host is still under attack (Step 508). If the host is still under attack, the DoS countermeasures continue to be used until such time as the attack is terminated. Once it is determined that the host is no longer under DoS attack, the host proceeds to deactivate the DoS countermeasures and resume normal operation (Step 510).

Figure 6:
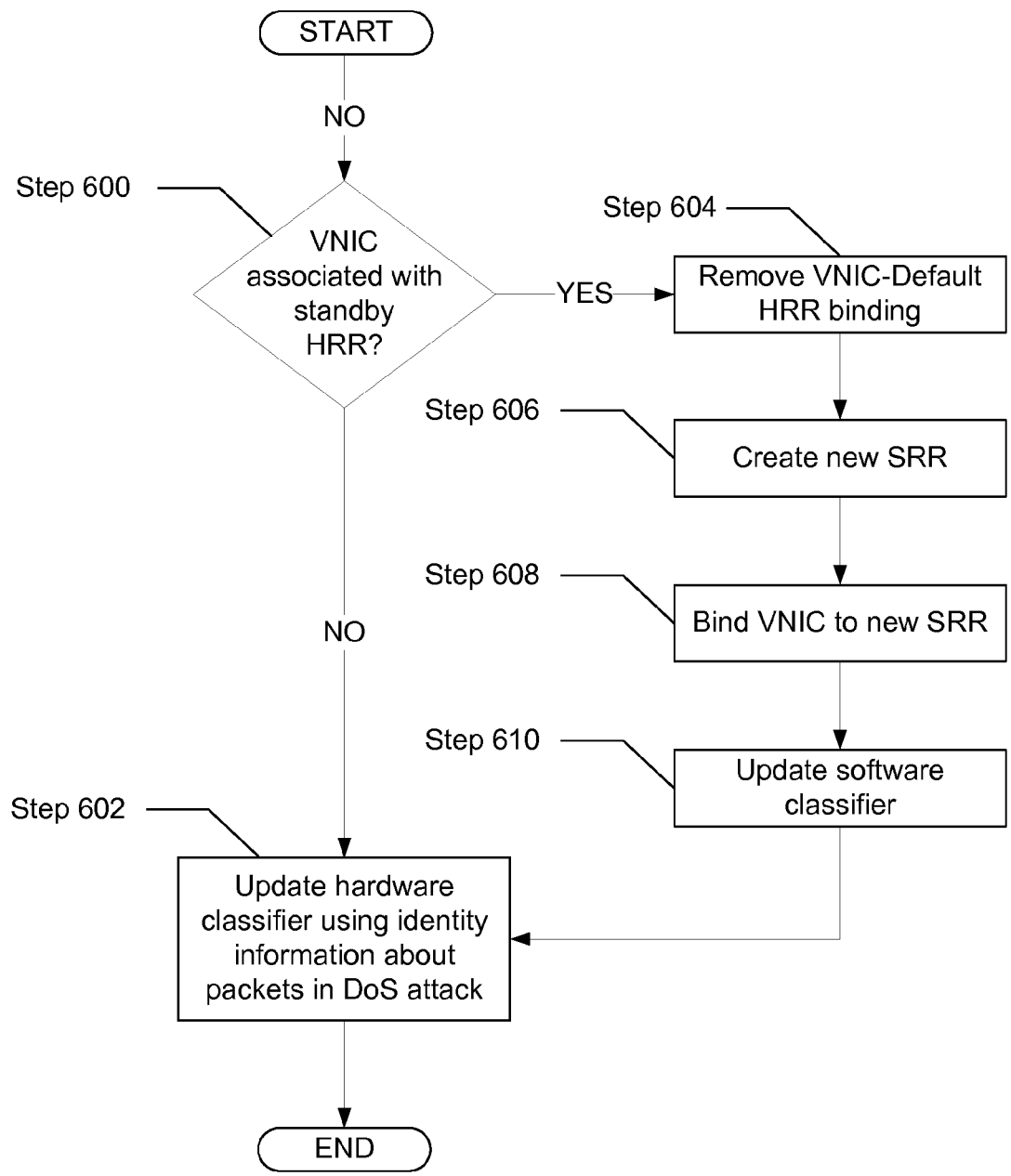

FIG. 6 shows a flowchart in accordance with one embodiment of the invention. More specifically, FIG. 6 shows a method for initializing the DoS countermeasures in accordance with one embodiment of the invention. Initially, a determination is made about whether there is a virtual NIC associated with the standby hardware receive ring (HRR) (Step 600). If it is determined at Step 600 that there is a virtual NIC associated with the standby HRR, then the virtual NIC-standby HRR binding is removed (i.e., the virtual NIC no longer receives packets from the standby HRR) (Step 604).

A new software receive ring (SRR) is then created in a software ring executing on the host (Step 606). In one embodiment of the invention, if the host does not include a software ring, then the software ring with a software receive ring and software classifier is created. Further, as an alternative to creating a new SRR, an existing SRR may be selected. The virtual NIC (i.e., the virtual NIC in Step 604) is associated with the SRR created (or selected) in Step 606 (Step 608). The software classifier is subsequently updated (i.e., the classification logic in the software classifier is updated) such that packets for a packet destination associated with the virtual NIC (i.e., the virtual NIC in Step 604) are sent to the SRR created (or selected) in Step 606 (Step 610).

Finally, the hardware classifier is updated to as follows: (i) if the standby HRR was associated with a virtual NIC (i.e., the virtual NIC in Step 604), then the hardware classifier (i.e., the classification logic in the hardware classifier) is updated such that packets for the packet destination associated with the aforementioned virtual NIC are sent to a non-standby HRR, where the non-standby HRR is configured to send packets to the software ring (i.e., the software ring discussed in Step 606) and (ii), regardless of whether the standby HRR was associated with a virtual NIC, the hardware classifier (i.e., the classification logic in the hardware classifier) is updated such that packets identified as being associated with the DoS attack are sent to the standby HRR (Step 602).

In one embodiment of the invention, after the DoS attacked on the host has commenced and the DoS countermeasures are active, the packets received in the standby HRR(s) are not sent to the host. Further, once the standby HRR(s) is "full" (i.e., the standby HRR(s)) cannot store any additional packets and all subsequently received packets are dropped by the standby HRR(s). Alternatively, the packets on the standby HRR(s) may be associated with virtual NIC (or virtual machine) and be processed by a low-priority thread.

In one embodiment of the invention, while the DoS attack is occurring, the packets not associated with the DoS attack are still sent to the host. Further, once the DoS attack has ceased, if the standby HRR(s) was initially bound to a virtual NIC(s) (or virtual machine), then the host may be returned to the state it was in prior to the onset of the DoS attack. Namely, the hardware classifier and software classifiers are returned to their pre-DoS attack state.

In one embodiment of the invention, the method is FIG. 6 is repeated for each HRR designated as a standby HRR, if more than one standby HRR exists in the NIC.

The following figures show examples in accordance with one or more embodiments of the invention. The examples are not intended to limit the scope of the invention.

Figure 7:
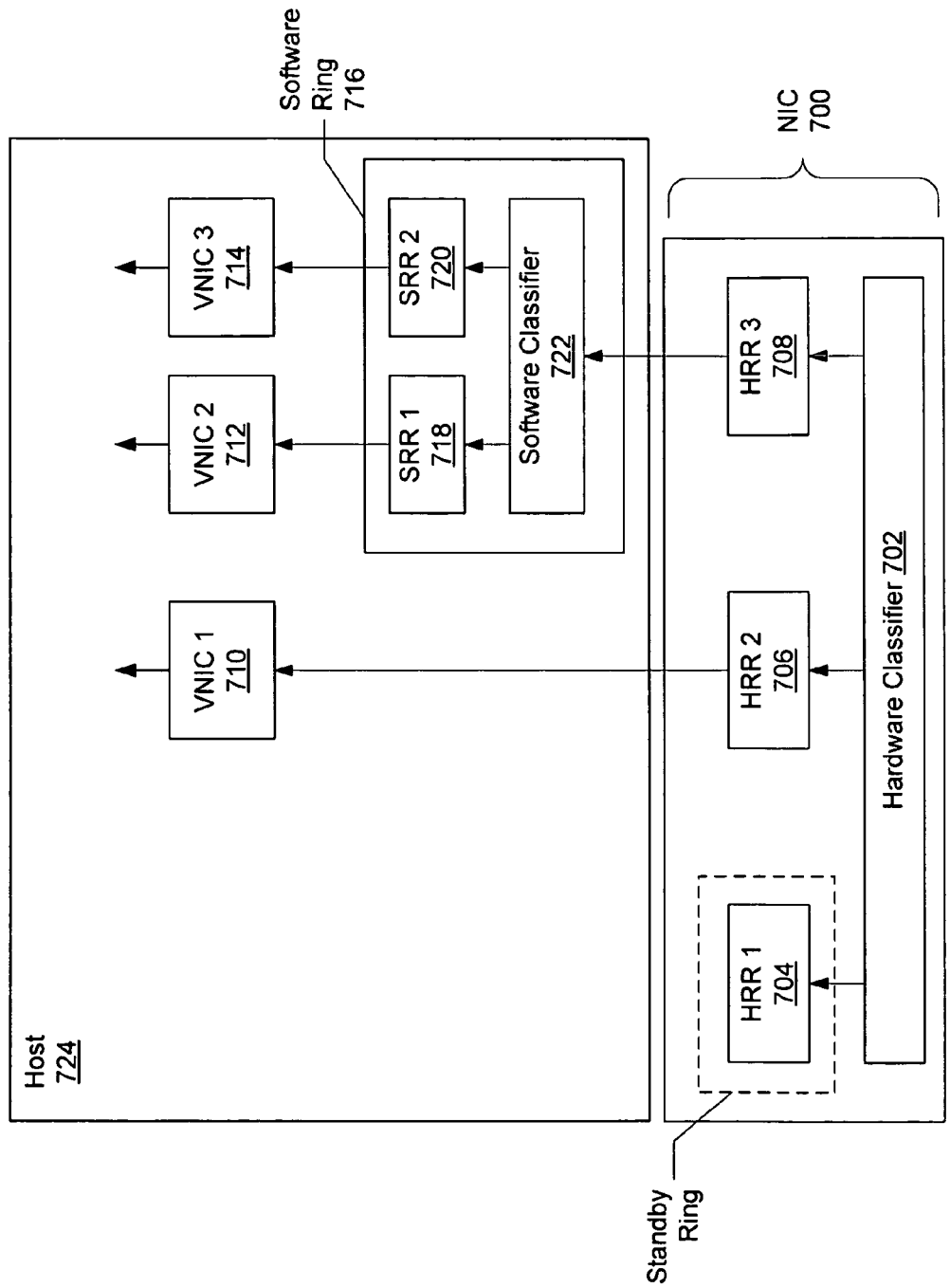
FIGS. 7 and 8 show examples in accordance with one or more embodiments of the invention.

FIG. 7 shows an example in accordance with one embodiment of the invention. The system shown in FIG. 7 includes a host (724) and a NIC (700), where the host (724) is operatively connected to the NIC (700). The host (724) includes three VNICs (710, 712, 714), where each of the VNICs (710, 712, 714) is associated with a virtual network stack (VNS) (or interface) (not shown) and a packet destination (or virtual machine) (not shown). The host (724) further includes a software ring (716), where the software ring (716) includes a software classifier (722) and two SRRs (718, 720). The software ring (718) is configured to obtain packets from HRR 3 (708). The software classifier (722) is configured to send packets for VNIC 2 (712) to SRR 1 (718) and to send packets for VNIC 3 (714) to SRR 2 (720).

The NIC (700) includes three HRRs (704, 706, 708) and a hardware classifier (702). HRR 1 (704) is designated as the standby HRR and the hardware classifier (702) is initially configured to: (i) send no packets to HRR 1 (704), (ii) send packets for VNIC 1 (710) to HRR 2 (704), and (iii) send packets for VNIC 2 (712) and VNIC 3 (714) to HRR 3 (708).

Once a DoS attack is detected, the host (724) is configured to update the programming of the hardware classifier (702) (or, more specifically, the programming of the classification logic in the hardware classifier) such that packets identified as part of the DoS attack are sent to HRR 1 (704). In this manner, the packets identified as part of the DoS attack are not sent to the host (724) and the host (724) may continue to operate during the DoS attack. Once the DoS attack ceases, the hardware classifier (702) may return to its initial programming (i.e., no packets are sent to HRR 1 (704)).

Figure 8:
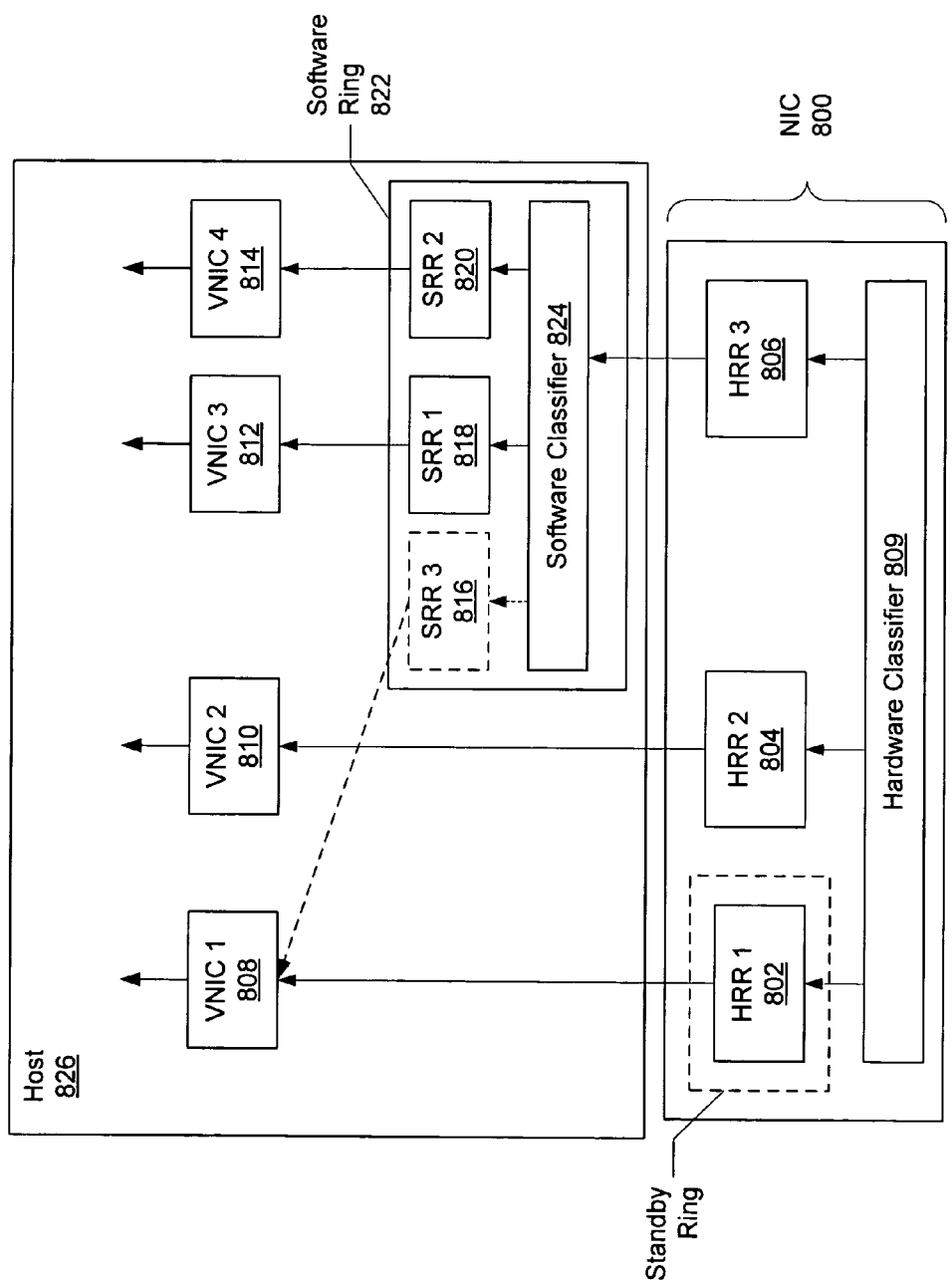

FIG. 8 shows an example in accordance with one embodiment of the invention. The system shown in FIG. 8 includes a host (826) and a NIC (800), where the host (826) is operatively connected to the NIC (800). The host (826) includes four VNICs (808, 810, 812, 814), where each of the VNICs (808, 810, 812, 814) is associated with a virtual network stack (VNS) (or interface) (not shown) and a packet destination (or virtual machine) (not shown). The host (826) further includes a software ring (822), where the software ring (822) includes a software classifier (824) and, initially, two SRRs (818, 820). The software ring (822) is configured to obtain packets from HRR 3 (708). The software classifier (722) is, initially, configured to: (i) send packets for VNIC 3 (812) to SRR 1 (818) and (ii) send packets for VNIC 4 (814) to SRR 2 (820).

The NIC (800) includes three HRRs (802, 804, 806) and a hardware classifier (809). HRR 1 (802) is designated as the standby HRR and the hardware classifier (809) is initially configured to: (i) send packets for VNIC 1 (808) to HRR 1 (802), (ii) send packets for VNIC 2 (810) to HRR 2 (804), and (iii) send packets for VNIC 3 (812) and VNIC 4 (814) to HRR 3 (806).

Once a DoS attack is detected, the host (826) is configured to update the programming of the hardware classifier (809) (or, more specifically, the programming of the classification logic in the hardware classifier) such that: (i) packets identified as part of the DoS attack are sent to HRR 1 (802) and (ii) packets associated with VNIC 1 (808) are sent to HRR 3 (806). In this manner, the packets identified as part of the DoS attack are not sent to the host (826) and the host (826) may continue to operate during the DoS attack.

Further, the software ring (822) is updated to include a new SRR (816). VNIC 1 (808) is subsequently updated to obtain packets from SRR 3 (816) and the software classifier (or, more specifically, the programming of the classification logic in the software classifier) (824) is updated such that packets for VNIC 1 (808) are sent to SRR (3).

Once the DoS attack ceases, the hardware classifier (809) may return to its initial programming. Further, VNIC 1 (808) may be modified to once again obtain packets from HRR 1 (808). Finally, the software ring (822) may remove SRR 3 (816) and allow the software classifier (824) to return to its initial programming.

Figure 9:
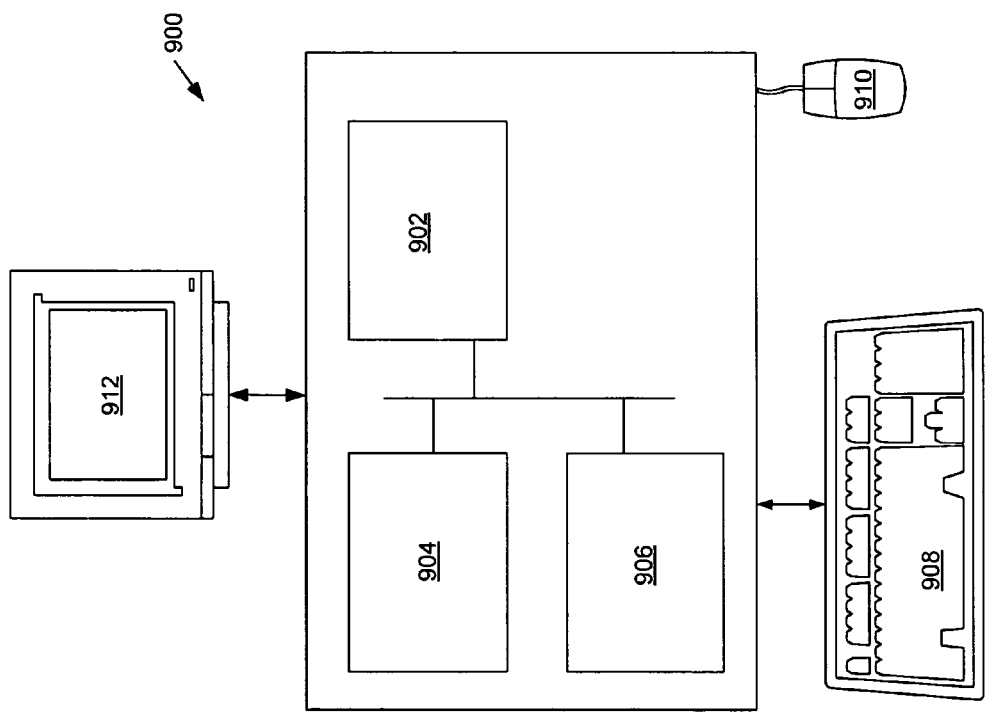
FIG. 9 shows a computer in accordance with one embodiment of the invention.

An embodiment of the invention may be implemented on virtually any type of computer regardless of the platform being used. For example, as shown in FIG. 9, a networked computer system (900) includes a processor (902), associated memory (904), a storage device (906), and numerous other elements and functionalities typical of today's computers (not shown). The networked computer (900) may also include input means, such as a keyboard (908) and a mouse (910), and output means, such as a monitor (912). The networked computer system (900) is connected to a local area network (LAN) or a wide area network via a network interface connection (not shown). Those skilled in the art will appreciate that these input and output means may take other forms. Further, those skilled in the art will appreciate that one or more elements of the aforementioned computer (900) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
    programming a hardware classifier in a network interface card (NIC) to send packets associated with a first packet destination to a non-standby hardware receive ring (HRR), wherein the first packet destination is located on a host;

programming a software classifier located on the host to obtain packets from the non-standby HRR;
programming the software classifier to send packets for the first packet destination to a first software receive ring (SRR) located on the host, wherein the first packet destination is associated with the first SRR;
obtaining identifying information about a denial of service (DoS) attack;
in response to obtaining identifying information about the DoS attack:
  programming the hardware classifier, using the identifying information, to send packets associated with the DoS attack to a standby HRR;
  receiving a first packet by the hardware classifier;
  determining, based on the identifying information, that the first packet is associated with the DoS attack;
  in response to determining, based on the identifying information, that the first packet is associated with the DoS attack, sending the first packet to the standby HRR;
  receiving a second packet by the hardware classifier;
  determining, based on the identifying information, that the second packet is not associated with the DoS attack;
  in response to determining, based on the identifying information, that the second packet is not associated with the DoS attack, sending the second packet to the non-standby HRR; and
  obtaining, by the software classifier, the second packet from the non-standby ring,
wherein the standby HHR and the non-standby HRR are located on the NIC,
wherein packets sent to the standby HRR are not sent to the host,
wherein the NIC is interposed between the host and a network, and
wherein the NIC is configured to receive, from the network, packets addressed to the host.

2. The method of claim 1, wherein the software classifier is located in a Media Access Control (MAC) layer of the host and wherein the host is operatively connected to the NIC.

3. The method of claim 1, wherein the first packet destination is a virtual machine.

4. The method of claim 1, wherein the first packet destination is associated with a virtual NIC and wherein the virtual NIC is interposed between the first packet destination and the first SRR.

5. A method for processing packets, comprising:
initially programming a hardware classifier in a network interface card (NIC) to send packets associated with a first packet destination to a standby hardware receive ring (HRR) and to send packets associated with a second packet destination to a non-standby HRR, wherein the first packet destination and the second packet destination are located on a host;
initially programming a software classifier located on the host to obtain packets from the non-standby HRR;
initially programming the software classifier to send packets for the second packet destination to a first software receive ring (SRR), wherein the second packet destination is associated with the first SRR;
obtaining identifying information about packets associated with a denial of service (DoS) attack;
in response to obtaining identifying information about packets associated with the DoS attack:
  re-programming the hardware classifier, using the identifying information, to send the packets associated with the DoS attack to the standby HRR;
  re-programming the hardware classifier, after obtaining the identifying information, to send packets for the first packet destination to the non-standby HRR;
  creating a second SRR;
  re-programming the software classifier, after obtaining the identifying information, to send packets for the first packet destination to the second SRR; and
  upon receiving a packet, determining, by the hardware classifier, to which of the standby HRR and the non-standby HRR to send the packet,
wherein the standby HHR and the non-standby HRR are located on the NIC,
wherein the first SRR and second SRR are located in a software ring located on the host,
wherein, after obtaining the identifying information, packets sent to the standby HRR are not sent to the host,
wherein the NIC is interposed between the host and a network, and
wherein the NIC is configured to receive, from the network, packets addressed to the host.

6. The method of claim 5, further comprising:
determining whether the DoS attack is over;
upon determining that the DoS attack is over:
  re-programming the hardware classifier to send packets associated with the first packet destination to the standby HRR and to send packets associated with the second packet destination to the second HRR; and
  de-programming the software classifier to send packets for the first packet destination to the second SRR.

7. The method of claim 6, further comprising:
removing the second SRR from the software ring after de-programming the software classifier to send packets for the first packet destination to the second SRR.

8. The method of claim 5, wherein the software ring is located in a Media Access Control (MAC) layer of the host.

9. The method of claim 5, wherein the second packet destination is associated with a virtual NIC and wherein the virtual NIC is interposed between the second packet destination and the first SRR.

10. The method of claim 5, wherein the first packet destination is a virtual machine executing on a host.

11. A system, comprising:
a network interface card (NIC), comprising:
  a standby hardware receive ring (HRR);
  a non-standby HRR; and
  a hardware classifier, wherein the hardware classifier is initially programmed to send packets for a first packet destination to the standby ring, wherein the hardware classifier is programmed to send packets for a second packet destination to the non-standby ring, wherein the hardware classifier is initially configured to:
    for each packet received by the NIC, determine to which of the standby HRR and the non-standby HRR to send the packet based on programming of the hardware classifier; and
a host, operatively connected to the NIC, comprising:
  the first packet destination, initially configured to receive packets from the standby HRR;
  the second packet destination, initially configured to receive packets from a first software receive ring (SRR); and
  a software ring, comprising:
    the first SRR; and a software classifier, initially configured to send packets for the second packet destination to the first SRR,
wherein the software ring is configured to obtain packets from the non-standby HRR,
wherein the host is configured to:
  obtain identifying information about packets associated with a denial of service (DoS) attack on the host;
  re-program the hardware classifier, using the identifying information, to send packets associated with the DoS attack to the standby HRR;
  re-program the hardware classifier, after obtaining the identifying information, to send packets for the first packet destination to the non-standby HRR; and
  re-program the software classifier, after obtaining the identifying information, to send packets for the first packet destination to a second SRR of the software ring,
wherein, after obtaining the identifying information, packets sent to the standby HRR are not sent to the host,
wherein the NIC is interposed between the host and a network, and
wherein the NIC is configured to receive, from the network, packets addressed to the host.

12. The system of claim 11, wherein the software ring is located in a Media Access Control (MAC) layer of the host.

13. The system of claim 11, wherein the first packet destination is associated with a virtual NIC and wherein the virtual NIC is interposed between the first packet destination and the first SRR.

14. The system of claim 11, wherein the first packet destination is a virtual machine executing on the host.

\* \* \* \* \*